Jan. 16, 1968     W. MINKOFF     3,363,461
METHOD FOR MEASURING FLOW
Filed May 26, 1965
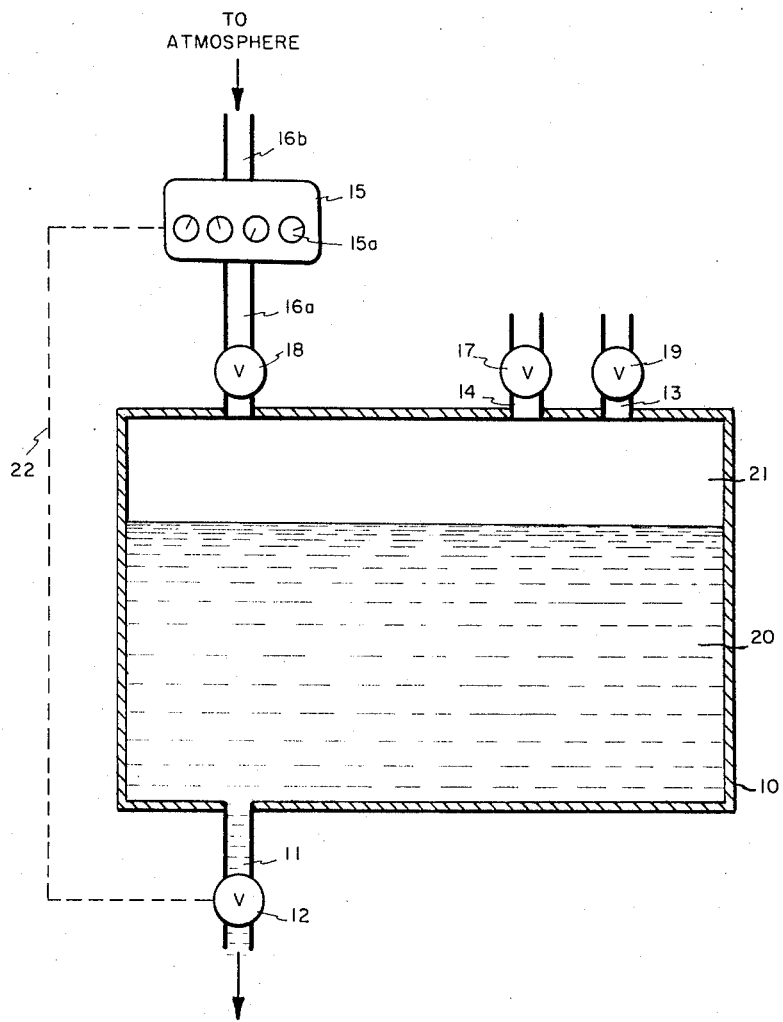
INVENTOR.
WALTER MINKOFF
BY *R. J. Frank*
ATTORNEY.

United States Patent Office 3,363,461
Patented Jan. 16, 1968

3,363,461
METHOD FOR MEASURING FLOW
Walter Minkoff, Rockville Centre, N.Y., assignor to
Peerless Paint & Varnish Corp., Brooklyn, N.Y., a
corporation of New York
Filed May 26, 1965, Ser. No. 458,911
3 Claims. (Cl. 73—194)

ABSTRACT OF THE DISCLOSURE

A method and apparatus for measuring the flow of corrosive and otherwise difficult-to-handle liquid and particulate materials. The flow of material is determined by measuring the volume of gas which enters the container as the material is withdrawn.

---

This invention relates to an apparatus and method for measuring the flow of materials which are corrosive or otherwise not suitable for measurement by conventional metering devices.

Many materials used in industry have properties which make them unsuitable for use with conventional flow or quantity meters. Materials in this category include corrosive and abrasive liquids and slurries as well as liquids with coarse suspended matter. Further, the flow of easily contaminated and hazardous materials, finely divided solids, and materials that tend to form films on the internal surfaces of metering devices is difficult to measure with accuracy.

It is usually possible to design a flow or quantity meter for the measurement of a specific difficult-to-handle material but such meters are expensive, may be restricted to use with only one material and often require components which must be replaced at frequent intervals. Also pumps and straining devices are sometimes required thereby adding to the expense and maintenance problems associated with such meters.

Accordingly, it is an object of my invention to provide an apparatus and method for measuring the flow of difficult-to-handle materials which does not require that the material pass through the metering device.

Another object is to provide a method of measuring the flow of a variety of such materials without modifying the metering device for each material.

Still another object is to provide a method of measuring the flow of difficult-to-handle materials which does not require the use of expensive metering apparatus.

In accordance with the present invention, a closed container is provided having an outlet member or line at the lower end thereof and an inlet line at the upper end. The inlet line is connected through a gas flow or quantity metering device to a source of gas maintained at or above atmospheric pressure.

The container is filled with liquid or particulate material to be measured by closing a valve in the outlet line and introducing the material through a fill valve. After the container has been filled, the fill valve is closed and the outlet valve opened. As the material flows out of the bottom of the container, the space between the surface of the material and the top of the container increases thereby lowering the pressure inside the container. Consequently, gas flows through the meter into the space above the surface of the material to restore the pressure equilibrium between the source of gas and the inside of the container.

The volume of gas flowing through the meter and into the container is equal to the volume of material withdrawn from the bottom of the container and therefore the meter reading is a direct measure of the volume of material withdrawn. Thus, a conventional inexpensive gas meter can be used to measure the flow of materials which can not be readily measured by direct methods.

The gas employed may be air or any inert gas which is insoluble in the material being metered and of lower density.

The above objects of and the brief introduction to the present invention will be more fully understood and further objects and advantages will become apparent from a study of the following description in connection with the figure, a schematic diagram of apparatus for carrying out my method of measuring the flow of difficult-to-handle materials.

Referring to the figure, there is shown a container or tank 10 which is completely enclosed except for an outlet pipe 11 provided with a valve 12 and fill and vent pipes 13 and 14 respectively. The tank, valves and piping may be constructed of stainless steel or other material which will not be affected by the contents of the container. In addition, the top of the tank is connected to the atmosphere through a gas meter 15 and meter coupling sections 16a and 16b. Meter 15 may be of any conventional type suitable for measuring the volume of air or an inert gas such as the diaphragm gas meter described at pages 865 and 866 of Chemical Engineering Handbook, second edition, published by McGraw-Hill Book Co., Inc. in 1941. Meter 15 is provided with a dial type indicator 15a as shown.

In a typical application, a material such as polyvinyl acetate latex emulsion is pumped into tank 10 through fill pipe 13. This emulsion is not measured readily by conventional rate or quantity meters since it contains suspended solids and has a tendency to set quickly and foam when flowing. The tendency to set and harden causes the internal surfaces of conventional meters to become coated during operation unless the meter is continuously flooded by the emulsion. Even with continuous flooding, however, the meter must be cleaned frequently thereby increasing maintenance costs requiring the equipment to be shut down at regular intervals.

During filling, vent valve 17 is opened to permit air to escape and meter valve 18 kept closed to prevent the escaping air from running the meter 15 backwards.

After tank 10 has been filled to the desired level with the emulsion 20, fill and vent valves 19 and 17 are closed and meter valve 18 is opened. Since the air pressure in the space above the emulsion 20 is equal to that of the atmosphere outside the tank, no air flows in through meter 15 and the meter is not actuated.

When outlet valve 12 is opened, the emulsion 20 flows out through pipe 11 under the force of gravity, decreasing the volume of the emulsion 20 in the tank by an amount $\Delta V$ and increasing the space 21 above the emulsion by the same amount. The increase in volume of space 21 lowers the pressure in space 21 causing a volume of air $\Delta V$ to flow through meter coupling sections 16a and 16b and meter 15 into space 21. This volume of air is recorded on the quantity meter 15 and is equal to the volume of emulsion flowing out through pipe 11.

Thus, a relatively inexpensive and easily maintained gas meter may be used to measure the flow of the emulsion 20 since the emulsion never comes in contact with the meter. Further, as indicated by dashed line 22, the meter 15 may be supplied with means for closing valve 12 when a predetermined amount of the emulsion 20 has been withdrawn.

In a typical installation, tank 20 had a capacity of 1600 gallons and the latex emulsion was allowed to flow at the rate of 15–20 gallons per minute. It was found that with a gas meter of the type described, the volume of latex removed from the tank was measured with excellent accuracy.

While my method has been described employing a polyvinyl acetate latex emulsion, it will be understood it can be used with any other liquid and with free-flowing finely divided solids as well. Also, if desired, any inert gas, such as carbon dioxide or nitrogen may be used instead of venting to the atmosphere.

As many changes could be made in the above construction and many different embodiments could be made without departing from the scope thereof, it is intended that all matter contained in the above description or shown in the accompanying drawing shall be interpreted as illustrative and not in a limiting sense.

What is claimed is:
1. The method of indirectly measuring the flow of liquid and particulate materials from a closed container having an inlet line, a vent line and a fill line at the top of said container, and an outlet line at the bottom thereof, said method comprising the steps of
   (a) closing said outlet line, opening said vent line to connect said container to an external source of gas having a predetermined pressure, and opening said fill line,
   (b) introducing said material into said container through said fill line and then closing said fill line,
   (c) closing said vent line and connecting said source of gas to said inlet line, the pressure above said material being substantially equal to the pressure of said external source of gas,
   (d) opening said outlet line to withdraw said material through said outlet line, the volume in said container above said material increasing as said material is withdrawn, and
   (e) simultaneously measuring the volume of gas flowing into said container from said source of gas, said gas flow maintaining the pressure above said material at the pressure of said source of gas, the volume of gas measured being substantially equal to the volume of material withdrawn.

2. The method of indirectly measuring the flow of liquid materials as defined in claim 1 wherein said gas is inert, insoluble in said liquid material and of lower density than said liquid.

3. The method of indirectly measuring the flow of liquid and particulate materials defined in claim 1 wherein the inlet line is vented to the atmosphere and said gas is air.

References Cited
UNITED STATES PATENTS

| | | | |
|---|---|---|---|
| 536,606 | 4/1895 | Crawford et al. | 73—198 |
| 1,335,700 | 3/1920 | Price | 222—20 |
| 1,508,969 | 9/1924 | Guichard | 73—290 |
| 2,168,106 | 8/1939 | Saur | 73—290 |
| 3,199,511 | 8/1965 | Kulick | 222—395 X |

FOREIGN PATENTS

| | | |
|---|---|---|
| 499,400 | 1/1939 | Great Britain. |
| 615,246 | 12/1933 | Germany. |
| 697,341 | 9/1940 | Germany. |
| 701,392 | 12/1940 | Germany. |

RICHARD C. QUEISSER, *Primary Examiner.*

E. D. GILHOOLY, *Assistant Examiner.*